United States Patent
Qi

(10) Patent No.: US 9,854,507 B2
(45) Date of Patent: Dec. 26, 2017

(54) FLEXIBLE CONNECTIVITY FRAMEWORK

(71) Applicant: Emily H. Qi, Camas, WA (US)

(72) Inventor: Emily H. Qi, Camas, WA (US)

(73) Assignee: Intel IP Corporation, Santa Clara, CA (US)

(*) Notice: Subject to any disclaimer, the term of this patent is extended or adjusted under 35 U.S.C. 154(b) by 160 days.

(21) Appl. No.: 14/751,432

(22) Filed: Jun. 26, 2015

(65) Prior Publication Data

US 2016/0234758 A1   Aug. 11, 2016

Related U.S. Application Data

(60) Provisional application No. 62/113,986, filed on Feb. 9, 2015.

(51) Int. Cl.
| | |
|---|---|
| H04W 76/02 | (2009.01) |
| H04W 48/14 | (2009.01) |
| H04W 40/24 | (2009.01) |
| H04L 29/08 | (2006.01) |
| H04W 48/18 | (2009.01) |
| H04W 84/18 | (2009.01) |

(52) U.S. Cl.
CPC ......... *H04W 48/14* (2013.01); *H04L 67/1068* (2013.01); *H04W 40/246* (2013.01); *H04W 76/023* (2013.01); *H04W 48/18* (2013.01); *H04W 84/18* (2013.01)

(58) Field of Classification Search
CPC ............ H04L 67/1068; H04W 40/246; H04W 48/14; H04W 48/18; H04W 76/023; H04W 84/18

USPC .......................................................... 370/254
See application file for complete search history.

(56) References Cited

U.S. PATENT DOCUMENTS

| | | | | |
|---|---|---|---|---|
| 2014/0269555 A1* | 9/2014 | Sadasivam | ........ | H04W 72/0406 370/329 |
| 2014/0293978 A1* | 10/2014 | Yang | ...................... | H04W 8/005 370/338 |
| 2014/0351476 A1* | 11/2014 | Huang | ................... | G06F 1/1632 710/303 |
| 2014/0351927 A1* | 11/2014 | Huang | ..................... | G06F 21/44 726/19 |
| 2015/0257188 A1* | 9/2015 | Patil | ....................... | H04W 4/008 455/41.1 |
| 2015/0296416 A1* | 10/2015 | Lee | ........................ | H04W 8/005 370/331 |
| 2016/0050551 A1* | 2/2016 | Qi | .......................... | H04W 8/005 455/434 |
| 2016/0278144 A1* | 9/2016 | Lee | ....................... | H04W 76/023 |
| 2017/0006456 A1* | 1/2017 | Lee | ........................ | H04W 48/10 |
| 2017/0055203 A1* | 2/2017 | Lee | ........................ | H04W 48/16 |

* cited by examiner

*Primary Examiner* — Robert Lopata
(74) *Attorney, Agent, or Firm* — Eversheds Sutherland (US) LLP

(57) ABSTRACT

This disclosure describes systems, methods, and apparatuses related to a flexible connectivity framework. A device may cause to send a discovery request seeking a service. The device may identify a discovery response received from a computing device advertising the service. The device may cause to send a connectivity information request to the computing device. The device may identify a connectivity information response including one or more session information received from the computing device.

20 Claims, 7 Drawing Sheets

FLEXIBLE CONNECTIVITY FRAMEWORK

CROSS-REFERENCE TO RELATED APPLICATIONS

This application claims the benefit of U.S. Provisional Application No. 62/113,986, filed Feb. 9, 2015 the disclosure of which is incorporated herein by reference.

TECHNICAL FIELD

This disclosure generally relates to systems, methods, and apparatuses for wireless communications and, more particularly, to flexible connectivity between wireless devices.

BACKGROUND

Wireless devices are becoming widely prevalent, making them suited for location-based services. Wireless devices may benefit from location-based services that may result in an enhanced user experience. Recently, there has been a shift in technology to support direct wireless communications between wireless devices.

DETAILED DESCRIPTION

Figure 1:
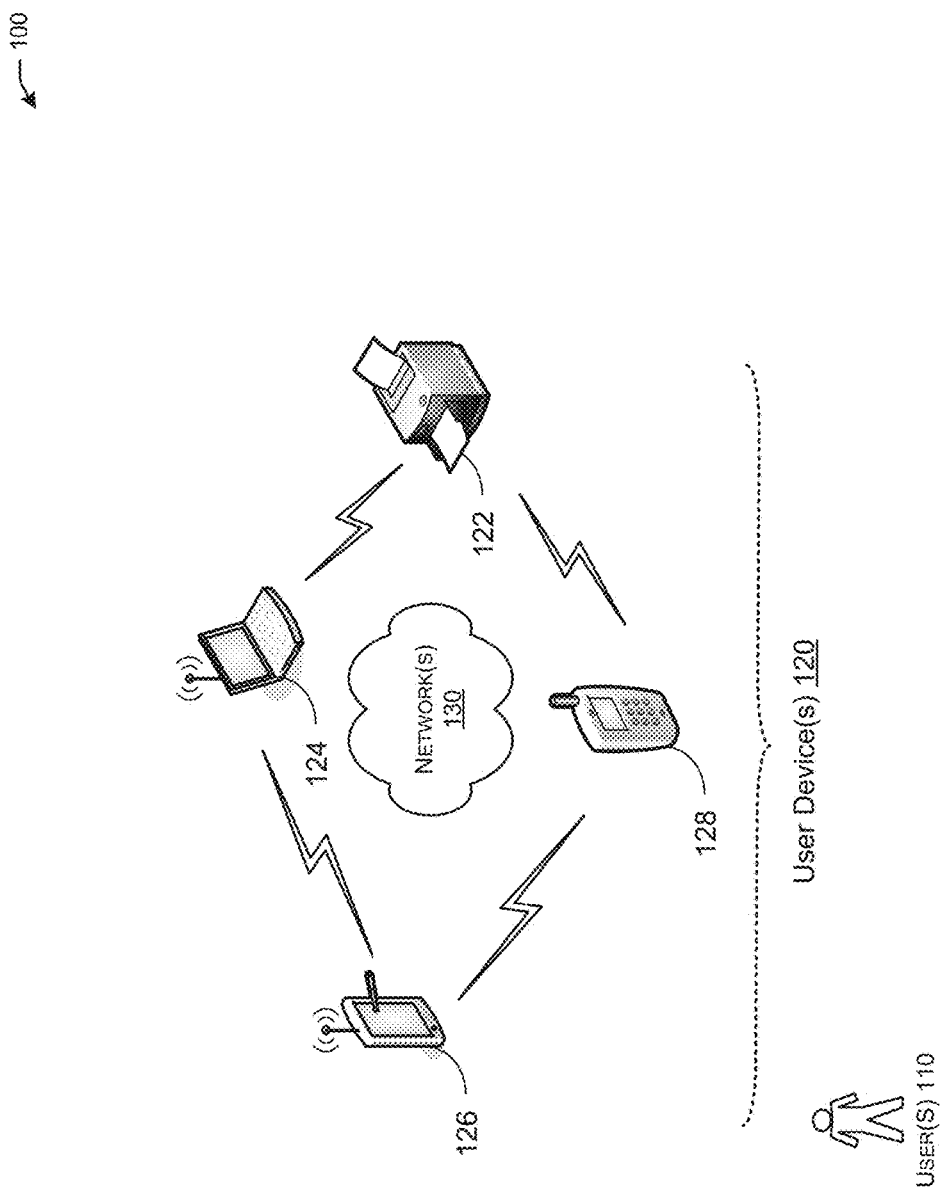
FIG. 1 depicts a network diagram illustrating an example network environment of an illustrative flexible connectivity framework system, in accordance with one or more example embodiments of the disclosure.

Example embodiments described herein provide certain systems, methods, and devices for providing a framework for flexible connectivity between wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refer to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, a user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates a radio frequency identification (RFID) element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MCM), discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

As Wi-Fi technology increases in both technical complexity and a broadening feature set, a common platform allowing interoperability may be necessary in order to support this increase. Additionally, the Wi-Fi alliance ensures that Wi-Fi products (e.g., user devices) from multiple manufacturers work well together. In addition, the existing Wi-Fi Direct services (WFDS) discovery protocol does not provide information to set up an application service platform (ASP) session via an AP infrastructure. The WFDS specification defines the architecture, protocols and functionality for interoperability of Wi-Fi Direct Services. An ASP session is a software service or library that implements the common functions needed by all applications and services conforming to the WFDS specification. For example, the existing WFDS discovery protocol cannot be used in Bluetooth low energy (BLE) and near field communication (NFC).

Example embodiments of the present disclosure relate to systems, methods, and devices for a flexible connectivity framework that facilitates discovery between two user devices using out-of-band (non-Wi-Fi) discovery and Wi-Fi discovery procedures to ensure that the necessary information needed to set up a connection is exchanged between these user devices. In one embodiment, an Application Service Platform Release 2 (ASP2) program may extend the mechanism of Wi-Fi Direct discovery to also make use of Wi-Fi Aware, BLE, and NFC, and may extend Wi-Fi Direct connectivity to the Wi-Fi infrastructure. A flexible connectivity system may be implemented to facilitate the connectivity between two devices, using ASP2, without the need to determine which discovery method or connectivity method to use. For instance, using BLE under ASP2 to discover and set up connectivity between two devices may not be sufficient because of the very short packet size of the BLE packets. For example, out-of-band (non-Wi-Fi) discovery procedure may be carried out in BLE discovery using BLE protocol(s), NFC discovery using NFC protocol(s), or quick response (QR) code discovery using QR protocol(s). The Wi-Fi discovery procedure may be carried out in Peer-to-Peer (P2P) discovery using P2P protocol(s), a Wi-Fi Aware discovery using Wi-Fi Aware protocol(s), a Wi-Fi infrastructure discovery using Wi-Fi infrastructure protocol(s), or a Wi-Fi Direct discovery using Wi-Fi Direct protocol(s). The out-of-band discovery and the Wi-Fi discovery may enable two user devices to discover and exchange data between each other to set up a connection between them using one of the Wi-Fi connectivity topologies (e.g., P2P, Wi-Fi infrastructure, or Wi-Fi Aware data path).

FIG. 1 is a network diagram illustrating an example wireless network 100 of a flexible connectivity framework system, according to some example embodiments of the present disclosure. Wireless network 100 can include one or more user devices 120 (e.g., 122, 124, 126, or 128), which may communicate in accordance with wireless standards, such as the IEEE 802.11 communication standards. For example, two or more wireless devices may perform connectivity procedures with one another in order to set up Wi-Fi data sessions, according to some example embodiments of the present disclosure. In the example of FIG. 1, a wireless communication channel may be established between two or more wireless devices (e.g., user device(s) 120), where a first user device 120 may correspond to a service seeker, and a second user device 120 may correspond to a service advertiser. A service advertiser may be a wireless device that may advertise and provide one or more of these services over a wireless communication channel. The user device(s) 120 may be wireless devices that are non-stationary and do not have fixed locations. A service seeker may be a wireless device that is seeking certain services, such as printing, playing content, sending, docking, etc.

Systems and methods in accordance with various embodiments of the present disclosure provide a flexible connectivity framework (FCF) for ASP2-enabled devices to set up connectivity between a seeker user device and an advertiser user device by using one or more discovery and connectivity mechanisms in order to connect these devices. Discovery methods may include, at least in part, Wi-Fi Aware, BLE, P2P, NFC, Wi-Fi infrastructure, and QR code. For example, the seeker user device may establish a connection with an advertiser user device using one of the supported topologies (e.g., Wi-Fi) without knowing which protocols the advertiser user device supports, in accordance with one or more embodiments of the present disclosure.

In one embodiment, FCF may include a common platform allowing interoperability between two or more user devices 120. If a seeker user device (e.g., user device 124) attempts to communicate with an advertiser user device (e.g., user device 122), FCF may allow user devices 124 and 122 to communicate using a common platform. For example, a wireless device (e.g., user device 124) may wish to find a printer (e.g., user device 122) to execute a print job. First, during a discovery stage, the wireless device may broadcast a message, seeking a printing service from another device. The discovery stage may include communication between the two devices (e.g., user devices 124 and 122) using one or more of Wi-Fi Aware, BLE, P2P, NFC, Wi-Fi infrastructure, and QR code messaging. The printer (e.g., user device 122) may receive that broadcast and may respond that it is able to perform that service. The discovery stage may allow the user devices 122 and 124 to determine whether the requested service may be accomplished. After the discovery stage, the two user devices may collect connectivity information necessary to establish a Wi-Fi connection between them in order to complete the print job. For example, some of the connectivity information may include the requested/provided service ID, the IDs of the two devices, the interface MAC address, etc. When both devices exchange connectivity information, they may establish a Wi-Fi connection in order to complete the print job. It is understood that this is an example and that other types of services and user devices may be involved.

In one embodiment, FCF may provide various discovery and connectivity methods such that one or more user devices 120 need not determine which discovery and connectivity methods were used. For example, the seeker user device 124 may not care which discovery and connectivity method is used. That is, the seeker user device 124 may utilize any of the discovery communications available between the two devices, such as Wi-Fi Aware, BLE, P2P, NFC, Wi-Fi infrastructure, and QR code messaging. In that case, FCF may facilitate the discovery and connectivity by providing a common interoperability platform. Consequently, a seeker user device looking to use a service (e.g., print, play, display, send, etc.) advertised by an advertiser user device may utilize FCF to complete the required service. FCF may include one or more operations that may provide various discovery and connectivity methods between two or more user devices. For example, a wireless device may use one of the various out-of-band (e.g., non-Wi-Fi) discovery methods, such as P2P discovery, Wi-Fi Direct discovery, NFC discovery, BLE discovery, Wi-Fi infrastructure discovery, and quick response (QR) code discovery, alone or in combination to determine which other wireless device is capable of performing a certain service. FCF may provide the ability to perform, for example, an out-of-band (e.g., non-Wi-Fi) discovery operation that collects connectivity information that may be utilized when setting up the communication between a seeker user device and an advertiser user device. When the communication is set up, the seeker user device and the advertiser user device may utilize one of the supported topologies, such as P2P, Wi-Fi infrastructure, or Wi-Fi Aware data path, to connect and complete the requested service.

Figure 6:
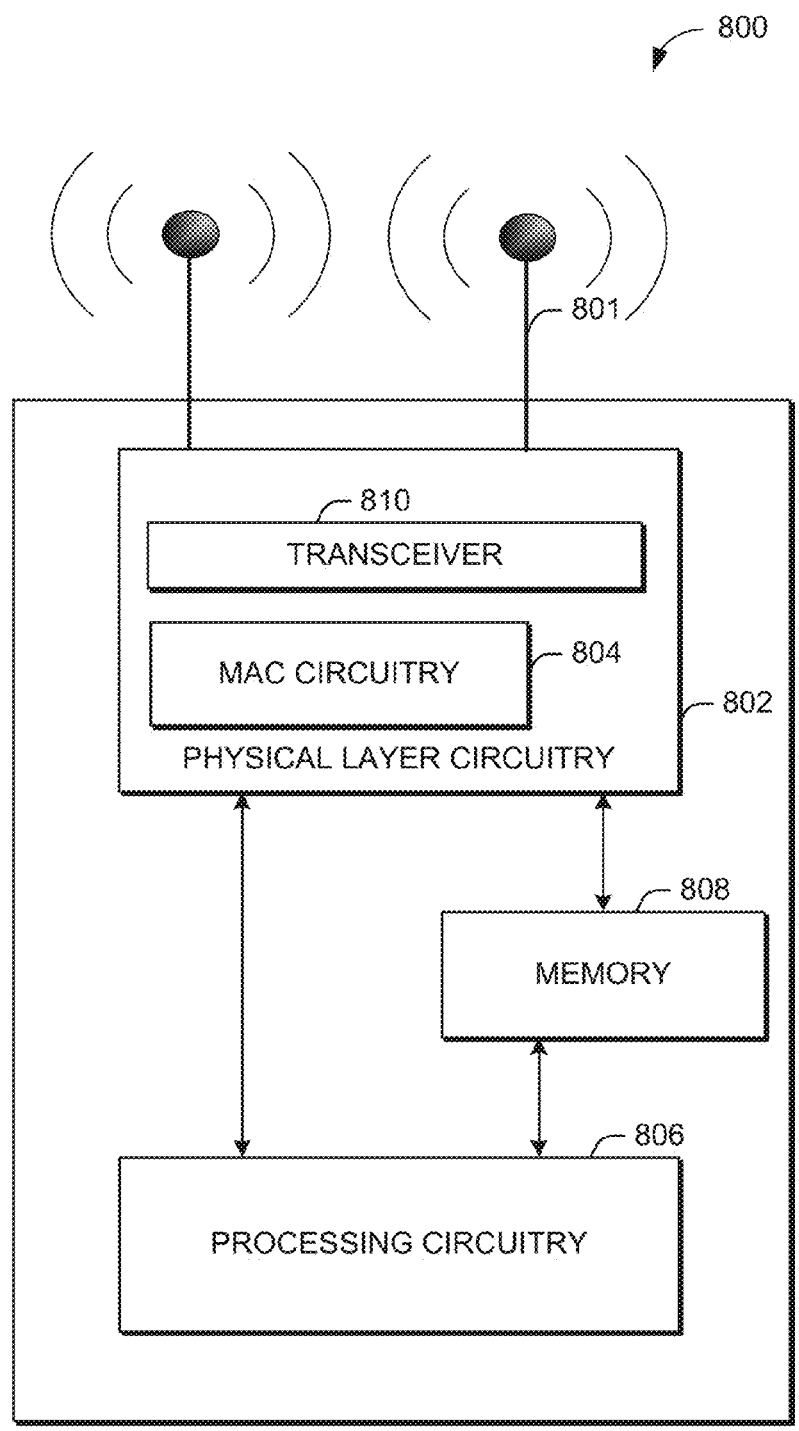
FIG. 6 illustrates a functional diagram of an example communication station that may be suitable for use as a user device, in accordance with one or more example embodiments of the disclosure.
Figure 7:
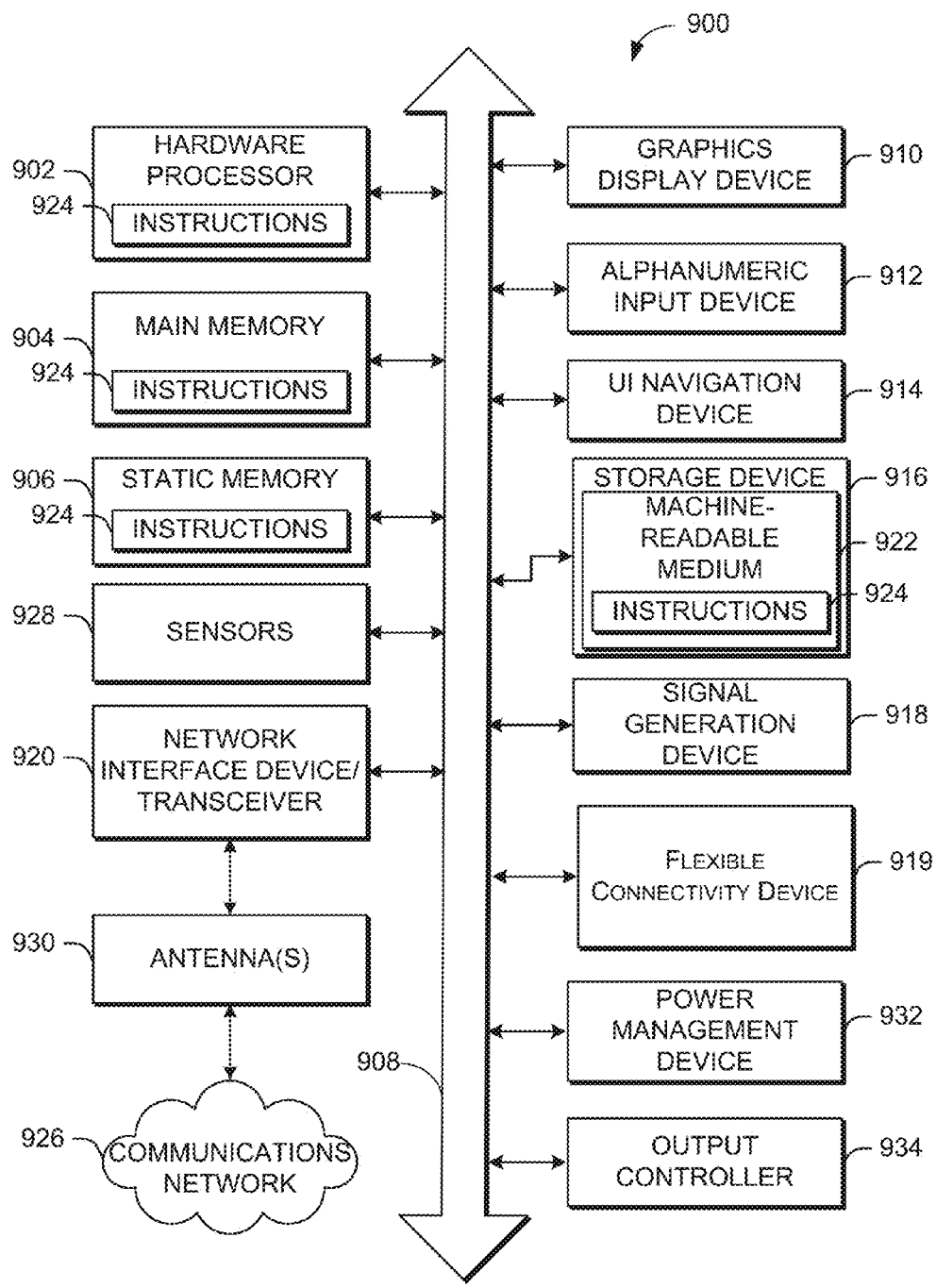
FIG. 7 is a block diagram of an example machine upon which any of one or more techniques (e.g., methods) may be performed, in accordance with one or more embodiments of the disclosure.

In some embodiments, the user devices 120 can include one or more computer systems similar to that of the functional diagram of FIG. 6 and/or the example machine/system of FIG. 7.

One or more illustrative user device(s) 120 may be operable by one or more user(s) 110. The user device(s) 120 (e.g., 122, 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.), and so forth.

Any of the user devices 120 (e.g., 122, 124, 126, or 128) may be configured to communicate with each other and any other component of the wireless network 100 directly and/or via one or more communications networks 130, wirelessly or wired.

Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi Direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Figure 2:
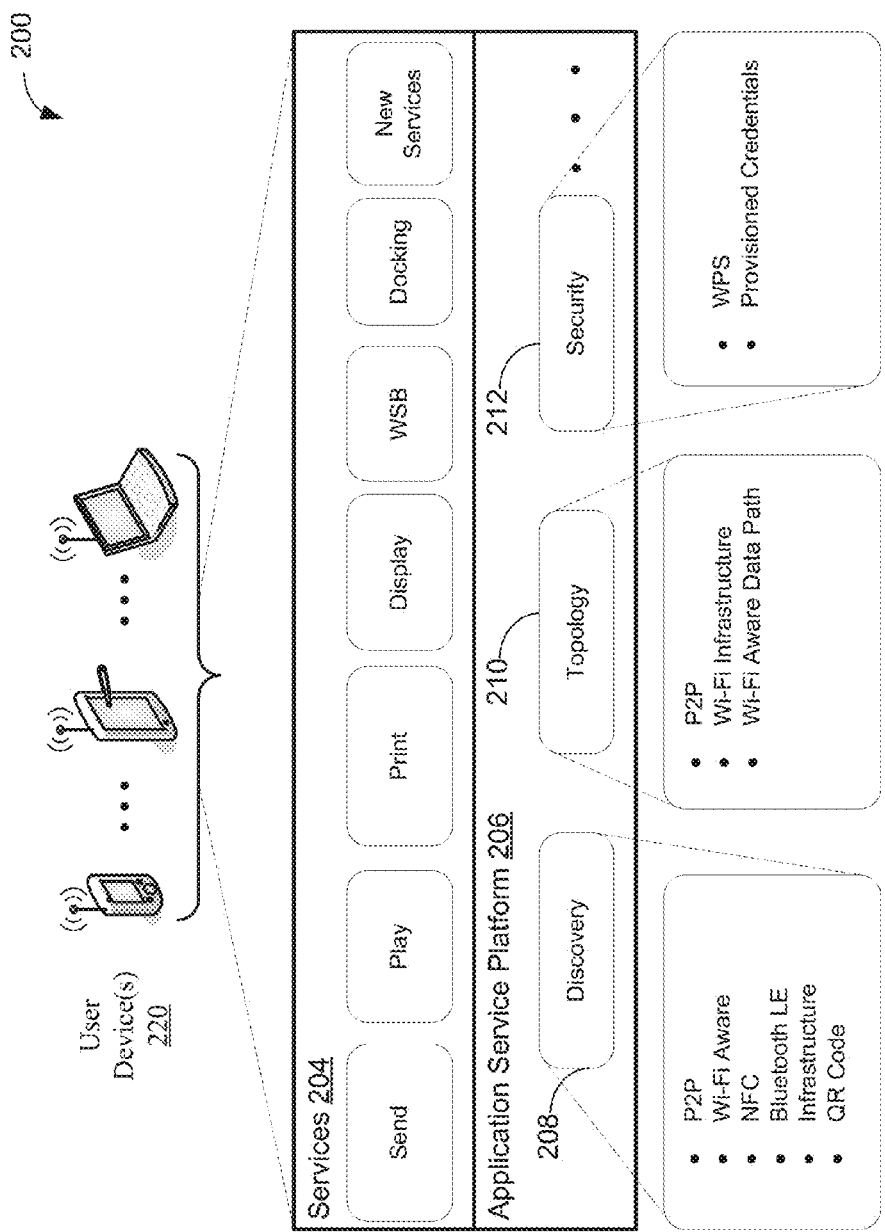
FIG. 2 depicts an illustrative schematic diagram of an example wireless communications stack including discovery and connectivity methods based on the Application Service Platform Release 2 (ASP2), in accordance with one or more embodiments of the disclosure.

FIG. 2 depicts an illustrative schematic diagram of an example wireless communications stack 200 including discovery and connectivity methods using FCF and based on ASP2, in accordance with one or more embodiments of the disclosure.

The wireless communication stack of FIG. 2 includes a set of services 204 and an application service platform (ASP) 206. The services 204 may include various services that may be provided or used by a user device 220 such as, but not limited to, a send service, a play service, a print service, a display service, a Wi-Fi serial bus (WSB) service, a docking service, or other services. The services 204 may support wireless serial protocols, such as Wi-Fi serial bus (WSB). The services 204 may be any service defined by the ASP and/or ASP2, which may be referred to for more detail, such as sending content, playing content, printing content, displaying content, docking, WSB, etc. The ASP 206 may provide discovery and topology mechanisms and a security mechanism 212. FCF may include the functions of discovery 208, topology 210, and security 212. Discovery 208 refers to the ability of the user device(s) 120 to discover each other using one or more protocols. For example, under ASP2, discovery 208 may include, in addition to P2P discovery, Wi-Fi Aware data path discovery, BLE discovery, QR code discovery, Wi-Fi Infrastructure and/or NFC discovery. Topology 210 may include connectivity topologies that facilitate the connection between the two or more user device(s) 120. For example, topology 210 may use P2P, Wi-Fi infrastructure, and/or Wi-Fi Aware data path. Security 212 may use Wi-Fi Protected Setup (WPS) and/or Provisioned Credentials.

In one embodiment, FCF may provide the capability of utilizing the various discovery methods and connectivity methods to provide a unified application interface to allow applications/users to specify services and connections without the need for the user to select the discovery or connectivity method. For example, an advertiser (e.g., user device 122) and a seeker (e.g., user device 124) may not know what type of connectivity that they could connect through in order to share services.

Figure 3:
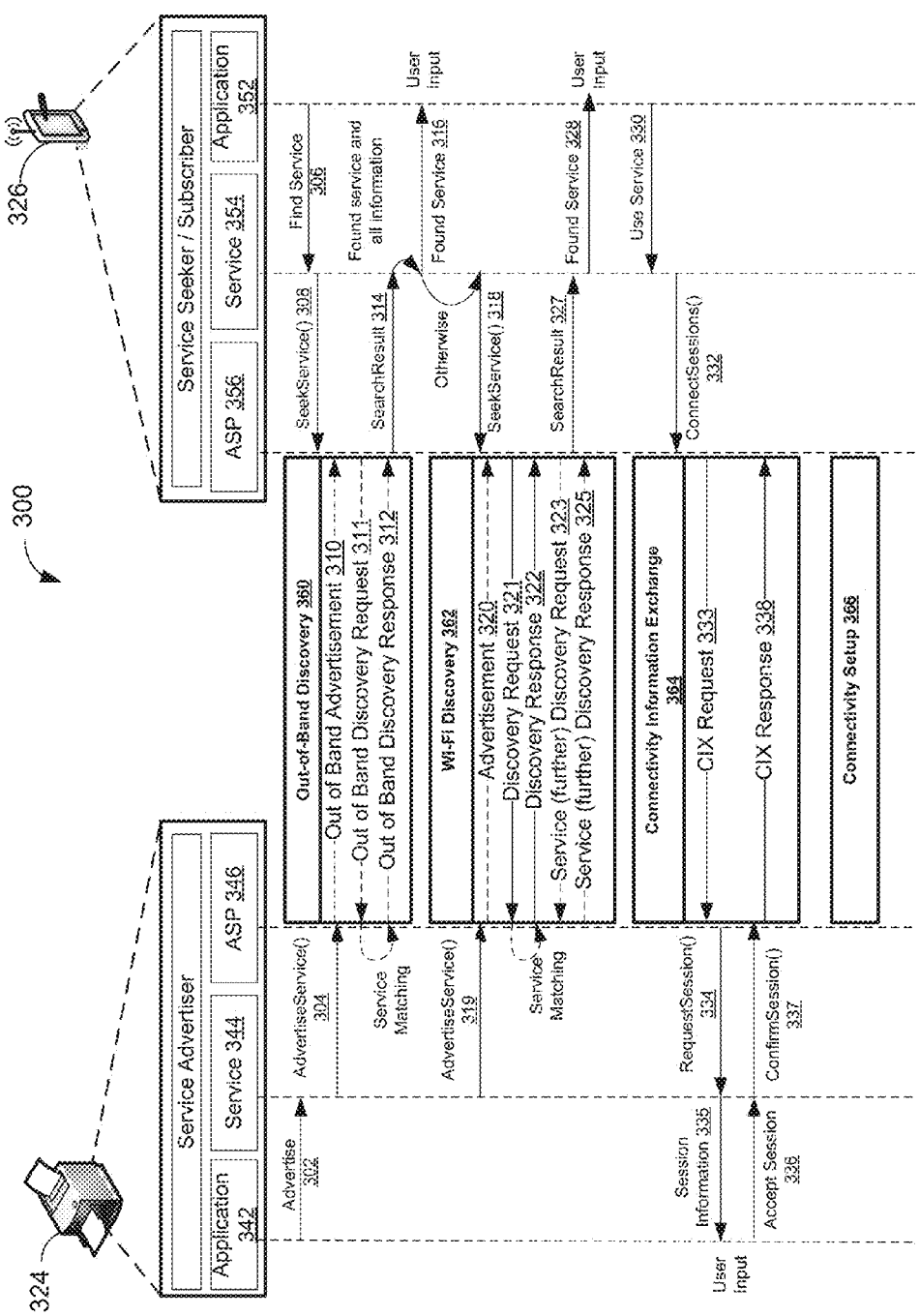
FIG. 3 depicts an example of an illustrative schematic message flow between components of a flexible connectivity framework system, in accordance with one or more embodiments of the disclosure.

FIG. 3 depicts an example FCF message flow 300, in accordance with one or more embodiments of the disclosure.

Referring to FIG. 3, there is shown a user device 324 (advertiser device) and a user device 326 (seeker device) that may wish to set up connectivity between each other based on the various services that are offered by the advertiser and based on the services needed by the seeker.

Regardless of which discovery or connectivity method is used in the ASP, an application/user may use a unified application interface to specify which service to find/provide, and whether to connect. The implementation of FCF may use language primitives, as defined in the WFDS specification. It is understood that language primitives are the simplest elements available in a programming language. For example, one or more primitives defined in WFDS, such as AdvertiseService( ), SeekService( ), SearchResult( ), ConnectSession( ), and ConfirmSession( ), may be used.

In one embodiment, FCF for ASP2 may facilitate various discovery and topology methods to establish connectivity, and ultimately set up an ASP session and a service session. An advertiser or a seeker device may include an application (e.g., applications 342 and 352), a service layer (e.g., service layers 344, 354), and an ASP layer (e.g., ASP layers 346, 356). These various layers may communicate with each other to advertise and/or seek a service in FCF. FCF may be explained in an example showing one or more operations (e.g., operations 360, 362, 364 and 366) that may be chosen by FCF. Each of these operations is optional and may be skipped if the prior operation provides sufficient information to proceed to the next operation. As shown in FIG. 3, FCF may include up to four operations: out-of-band (e.g., non-Wi-Fi) discovery 360, Wi-Fi discovery 362, connectivity information exchange 364 and connectivity setup 366.

In FCF, an advertiser device 324 may advertise a service when an application 342 is executed and an advertise 302 message is generated. Consequently, the service process 344 can initiate an AdvertiseService( ) 304 command to broadcast a service.

Similarly, when an application 352 is executed on a seeker device 326, and a find service message 306 is generated, a service process 354 can initiate a SeekService( ) 308 command requesting service discovery to ASP 356.

In response to the AdvertiseService( ) 304 command and/or the SeekService( ) 308 command, FCF may determine if the advertiser device 324 and/or the seeker device 326 have an out-of-band radio running (e.g., BLE, NFC, etc.). If so, FCF can initiate the out-of-band (non-Wi-Fi) discovery procedure 360. For example, the ASP 346 of the advertiser device 324 may transmit (or broadcast) an out-of-band advertisement 310 that may be received by the seeker device 326 to advertise the service(s) that is being advertised and supported by the advertiser device 324. Similarly, the ASP 356 of the seeker device 326 can transmit an out-of-band discovery request 311 where the seeker device 326 may request the discovery of service(s) that may be provided by an advertiser device (e.g., 324), using an out-of-band discovery method.

In one embodiment, if there is a service match, such that the service advertised matches the service requested, then the advertiser device 324 may respond using an out-of-band discovery response 312 message. However if there was no service match, then the advertiser device 324 may choose not to respond or may send a service mismatch message. In either case, the seeker device 326 may seek its service from another device.

In one embodiment, the out-of-band discovery 360 may involve sending/receiving a plurality of discovery messages (e.g., request and response messages) for the plurality of out-of-band discovery protocols (e.g., BLE, NFC, QR, etc.). The plurality of discovery messages may be sent/received sequentially or in parallel. When the discovery messages are sent/received sequentially, a user device (e.g., user devices 324 and/or 326) may send/receive each out-of-band discovery message using one of the one or more discovery protocols. For example, a discovery message using BLE may be first used, then the user device (e.g., user devices 324 and/or 326) may use other out-of-band discovery messages in sequence. For example, a user device (e.g., user devices 324 and/or 326) may first use BLE, then NFC then QR, etc. for the out-of-band discovery 360. Alternatively, the user device (e.g., user devices 324 and/or 326) may send the plurality of discovery messages for the plurality of out-of-band protocols simultaneously.

After the out-of-band discovery 360, the following information may be available for both devices (e.g., user devices 324 and 326): service ID, device ID, connectivity capability, interface media access control (MAC) address, connectivity information (optional) and availability (channel/band, timeslot) information (optional). Given the limited packet size, the BLE discovery result may not include the connectivity information and availability information but may include the other information. In that case, other out-of-band discoveries may be utilized to collect the connectivity information and the availability information if needed for establishing the Wi-Fi connection. In another example, the NFC discovery may include all information and in that case, there may be no need to perform additional discovery. It is understood that the above are only examples, and other information may be used.

In one embodiment, FCF may perform the out-of-band discovery 360 and/or the Wi-Fi discovery 362 or may perform the out-of-band discovery 360 and/or the Wi-Fi discovery 362 sequentially or in parallel. For example, if a device determines that no out-of-band radio is available, the device may proceed to perform Wi-Fi discovery 362. For example, BLE may be supported by a device (e.g., seeker device or advertiser device) but may not be activated and, therefore, may not be available for communications. In that case, out-of-band discovery using BLE may not be possible.

FCF may also choose to simultaneously start Wi-Fi discovery with out-of-band discovery if power consumption is not an issue and the low latency requirement is more important.

In one embodiment, the Wi-Fi discovery 362 may involve sending/receiving a plurality of discovery messages (e.g., request and response messages) for the plurality of Wi-Fi discovery 362 protocols (e.g., P2P, Wi-Fi Aware, Wi-Fi infrastructure, Wi-Fi Direct etc.). The plurality of discovery messages may be sent/received sequentially or in parallel. When the discovery messages are sent/received sequentially, a user device (e.g., user devices 324 and/or 326) may send/receive an Wi-Fi discovery requests using the one or more discovery protocols. For example, a discovery message using Wi-Fi Aware may be used. Further, the user device (e.g., user devices 324 and/or 326) may use other out-of-band discovery requests in sequence. For example, a user device (e.g., user devices 324 and/or 326) may first use P2P, then Wi-Fi Aware then Wi-Fi infrastructure, etc. for the Wi-Fi discovery 362. Alternatively, the user device (e.g., user devices 324 and/or 326) may send the plurality of discovery requests for the plurality of Wi-Fi protocols simultaneously.

In one embodiment, FCF may choose to forego the out-of-band discovery 360 and perform instead the Wi-Fi discovery 362. For example, the user may have previously performed out-of-band discovery and/or may have collected some or all the information needed for completing the service request. In other examples, interference, user device capability, signal strength, etc., may be factors in forgoing the out-of-band discovery 360.

Based on the SearchResult 314 message from the out-of-band discovery 360, FCF may determine whether to perform Wi-Fi discovery or not. If SearchResult 314 provides sufficient information to set up the connection between the seeker device 326 and the advertiser device 324, FCF may skip the Wi-Fi discovery 362. In that case, service 354 may send a Found Service 316 message to the application 352, which may present the user with an option to provide input to continue with the connectivity operation. Otherwise, FCF may provide a SeekService( ) 318 to the Wi-Fi radio of the seeker device 326 and/or may provide an AdvertiseService( ) 319, and may start Wi-Fi discovery 362. Wi-Fi discovery 362 may be established by various Wi-Fi discovery technologies: P2P discovery, Wi-Fi Aware data link discovery, and Wi-Fi infrastructure discovery.

In general, the seeker device 326 may send a discovery request message 321, including the following information: (seeking) service ID, service ID, interface MAC address, connectivity capability, connectivity information, and availability (channel/band and timeslot) information. It is understood that the above are only examples, and other information may be included.

The advertiser device 324 may send a discovery response message 322, including the following information: (offered) service ID, device ID, interface MAC address, connectivity capability, connectivity information, and availability (channel/band and timeslot) information. It is understood that the above are only examples, and other information may be included.

In some embodiments, the advertiser device 324 may send an unsolicited advertisement message 320. The contents of the unsolicited advertisement message 320 may be similar to the discovery response message 322, or may be similar to a subset of the discovery response message 322 if some information is not available. For example, the availability information may not be included or available. If the availability information or other essential information is not included in the unsolicited advertisement message 320, the seeker device 326 may transmit a service discovery request message 323, and the advertiser device 324 may send a service discovery response message 325 to include the missing information or all of the essential information. It is understood that the above are only examples, and other information may be included. At this point, ASP 356 may send a SearchResult 327 with the collected information to service 354 that would send a Found Service 328 command to the application 352. Following that, the application 352 may respond with a Use Service 330 command to use the discovered service. Subsequently, service 354 may send a Connect Sessions( ) 332 command to ASP 356.

In some embodiments, for P2P discovery, the request message may be a probe request frame, and the response message may be a probe response frame. For Wi-Fi Aware data link discovery, the request message may be a Wi-Fi Aware service discovery (subscribe) frame, and the response/advertisement message may be a Wi-Fi Aware service discovery (publish) frame. For Wi-Fi infrastructure discovery, the request and response messages may be layer 3 service discovery messages. It is understood that the above are example messages and that other messages may be possible.

After the Wi-Fi discovery 362, the following information may be available for the seeker device and the advertiser device: service ID, device ID, connectivity capability, availability information, and connectivity information (optional). It is understood that the above are only examples, and other information may be available.

In some embodiments, after the Wi-Fi discovery 362, FCF may initiate the connectivity information exchange (CIX) 364. With the CIX message exchange, the devices may be able to know the type of connectivity (e.g., Wi-Fi Direct (or P2P), Wi-Fi infrastructure, or Wi-Fi Aware data link) that may be set up between the two devices and may have enough information to set up connectivity (for example, which device is a group owner for Wi-Fi Direct connectivity).

CIX request 333 and CIX response 338 messages may include the following information: service ID, device ID, connectivity capability, corresponding connectivity attribute, and WPS/DPP configure methods (e.g., push button, PIN, or QC).

In one or more embodiments, if the "P2P bit" in connectivity capability is set, the P2P connectivity attribute may be defined and included. The P2P connectivity attribute is defined in the WFDS specification. If the "infra bit" in connectivity capability is set, the infrastructure connectivity attribute and the connection carrier may be included. The infrastructure connectivity attributes include IP address, subnet address, etc. If the Wi-Fi Aware data link bit in connectivity capability is set, the Wi-Fi Aware data link connectivity attribute shall be included. The Wi-Fi Aware data link connectivity attribute may include the Wi-Fi Aware data link group ID and the channel ID. It is understood that the above are only examples, and other information may be used.

The seeker device 326 may send the CIX request 333 message, which is a proposal. The ASP 346 of the advertiser device 324 may use a RequestSession( ) 334 primitive to generate a session information 335 message from the service 344 to the application 342. This information may require user input in order to accept the exchange of session information. The CIX may be a two-way message exchange if auto accept is set. In other words, if after the discovery operations 360 and 362, the user of the seeker device 326 and the user of the advertiser device 324 have auto accept on, the connection may be set up without user input. If the CIX response needs the user's input, the advertiser sends a CIX response message with status indicating "waiting for user response," and then may transmit a CIX response message with final connectivity information after the user's input. In the case that the auto accept is not set, and if the user accepts the CIX request 333, the application 342 may send an accept session 336 command to the service 344, which in turn sends a ConfirmSession( ) 337 command to ASP 346. Upon receipt of the CIX request 333 message, the advertiser device 324 may evaluate its connectivity information, may determine the final connectivity information, and may include it in the CIX response 338.

During the connectivity setup 366, if there is no existing connectivity between the advertiser device 324 and the seeker device 326, the seeker device 326 may start the connectivity setup 366 procedure. If the connectivity exists, this procedure may be skipped.

After the two devices, 324 and 326, set up connectivity, the two devices may set up an ASP session and a service session. The ASP session setup procedure and the service session setup procedure are defined in WFDS specification.

Figure 4:
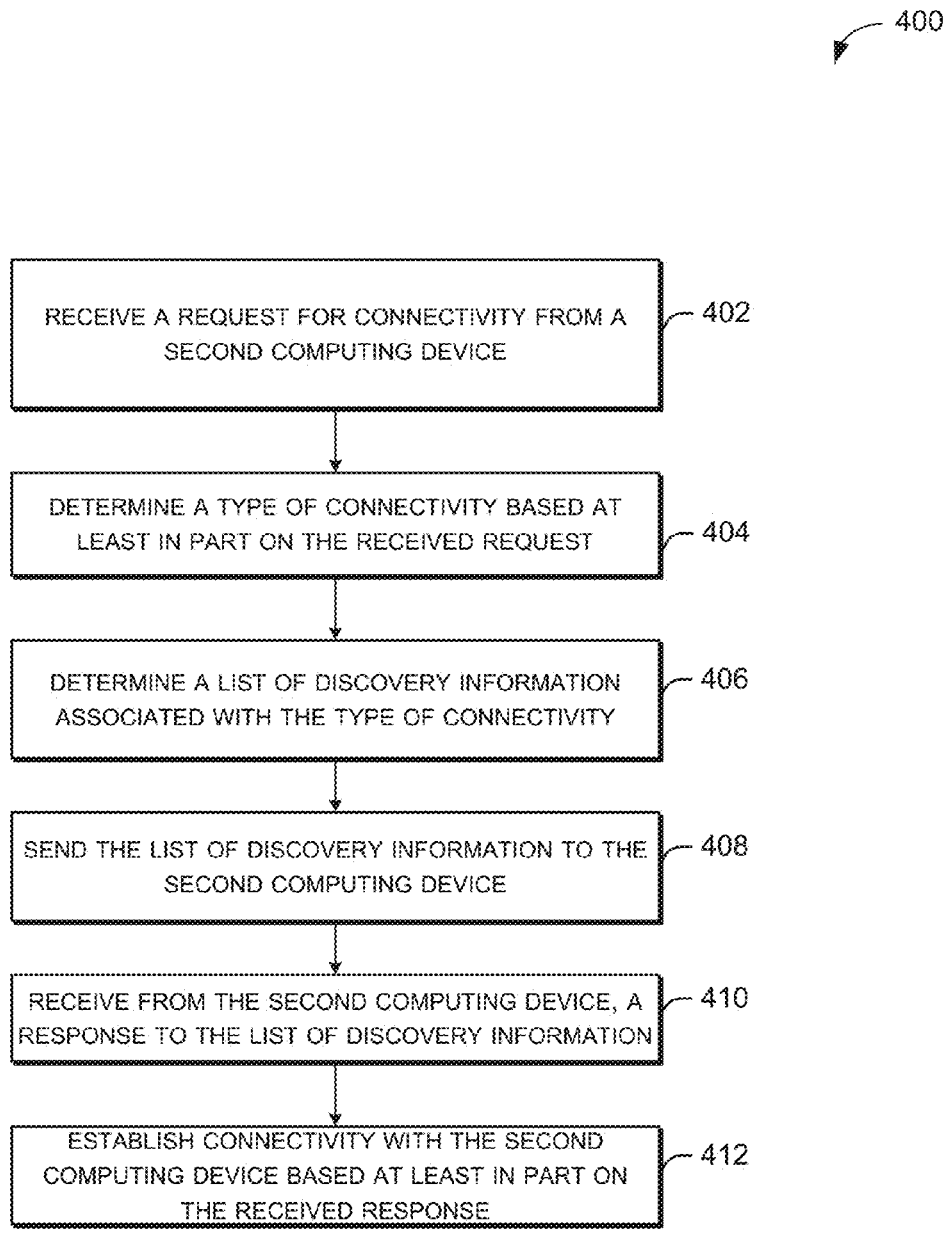
FIG. 4 depicts a flow diagram of an illustrative process for an illustrative flexible connectivity framework system, in accordance with one or more embodiments of the disclosure.

FIG. 4 illustrates a flow diagram of an illustrative process 400 for a flexible connectivity framework system in accordance with one or more embodiments of the disclosure.

At block 402, a user device may send a discovery request seeking a service. For example, a service seeker device may be a wireless device that is seeking certain services, such as printing, playing, sending, docking, etc. A service advertiser may be a wireless device that may advertise and provide one or more of these services over a wireless communication channel. The seeker device may perform an out-of-band discovery operation and/or a Wi-Fi discovery operation. The out-of-band discovery operation may be carried out using communication technologies that may be non-Wi-Fi, such as BLE, NFC, QR, etc. The Wi-Fi discovery operation may be carried out using communication technologies such as P2P, Wi-Fi infrastructure, or Wi-Fi Aware data link). With either of the discovery operations, the seeker device may send a discovery request to the advertiser device.

At block 404, the user device may identify a discovery response received from a computing device advertising the service. The advertiser device may respond with a discovery response and provide various information related to the out-of-band discovery and/or the Wi-Fi discovery operations. For example, the advertiser device may send a discovery response message, including the following information: (offered) service ID, device ID, interface MAC address, connectivity capability, connectivity information, and availability (channel/band and timeslot) information. It is understood that the above are only examples, and other information may be included.

At block 406, the user device may send a connectivity information request to the computing device. After performing at least one of the out-of-band and Wi-Fi discovery procedures, the seeker device may initiate a CIX operation. With the CIX message exchange, the devices may be able to know the type of connectivity (e.g., Wi-Fi Direct (or P2P), Wi-Fi infrastructure, or Wi-Fi Aware data link) that may be set up between the two devices and may have enough information to set up connectivity. The CIX operation includes a CIX request sent from the seeker device to the advertiser device requesting session information.

At block 408, the user device may identify a connectivity information response including one or more session information received from the computing device. At block 410, the advertiser device may respond with a CIX response that may return the session information necessary to establish the connection between the seeker device and the advertiser device. The CIX request and CIX response messages may include the following information: service ID, device ID, connectivity capability, corresponding connectivity attribute, and WPS/DPP configure methods (push button, PIN, or QC). Finally, at block 412, the connection may be set up between the seeker device and the advertiser device in order to complete the service that was requested.

Figure 5:
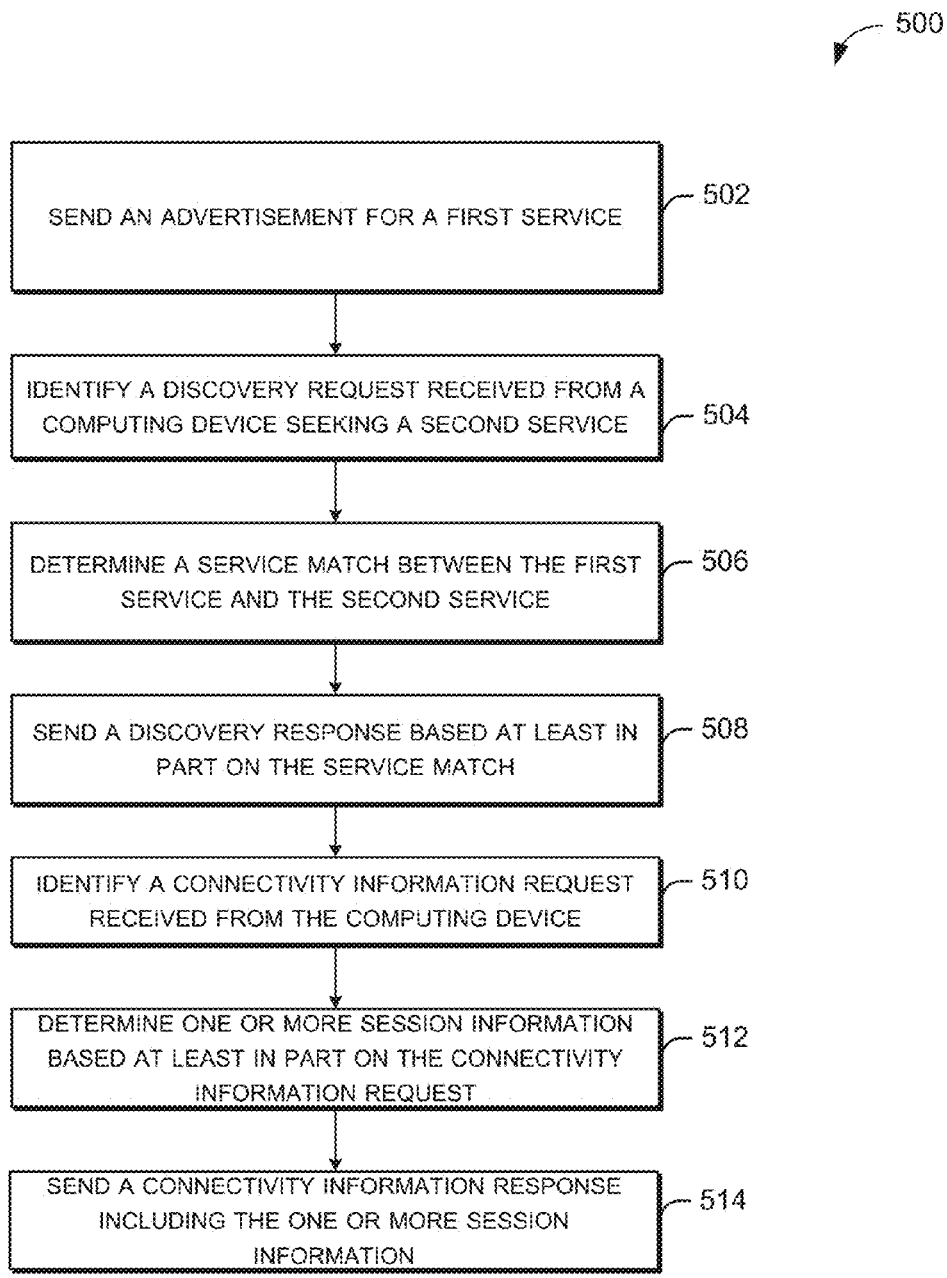
FIG. 5 depicts a flow diagram of an illustrative process for an illustrative flexible connectivity framework system, in accordance with one or more embodiments of the disclosure.

FIG. 5 illustrates a flow diagram of an illustrative process 500 for a flexible connectivity framework system in accordance with one or more embodiments of the disclosure.

At block 502, a user device (e.g., an advertiser device) may send an advertisement for a service. For example, a printer may advertise that it may provide printing capabilities. The advertisement may be a broadcast message that may be sent by the advertiser device. When a seeker device is looking to perform a service, the seeker device would receive the advertisement message and may set up the discovery procedure between the seeker device and the advertiser device.

At block 504, the user device may identify a discovery request received from the seeker device seeking a service. The seeker device may be seeking certain services, such as printing, playing, sending, docking, etc. The seeker device may perform an out-of-band discovery operation and/or a Wi-Fi discovery operation. The out-of-band discovery operation may be carried out using communication technologies that may be non-Wi-Fi, such as BLE, NFC, QR, etc. The Wi-Fi discovery operation may be carried out using communication technologies such as P2P, Wi-Fi infrastructure, or Wi-Fi Aware data link). With either of the discovery operations, the seeker device may send a discovery request to the advertiser device to determine whether there is a possibility of completing the sought or advertised service.

At block 506, the user device may determine a service match between the first service and the second service. If the advertised service and the sought service match, then the advertiser device may provide the seeker device with related discovery information. For example, if the advertised service is printing, and the sought service is also for a print job, a service match may result in the advertiser and the seeker devices continuing to set up the connection between them in order to complete the print job.

At block 508, the user device may cause to send a discovery response based at least in part on the service match. The advertiser device may respond with a discovery response and provide various information related to the out-of-band discovery and/or the Wi-Fi discovery operations. For example, the advertiser device may send a discovery response message, including the following information: (offered) service ID, device ID, interface MAC address, connectivity capability, connectivity information, and availability (channel/band and timeslot) information. It is understood that the above are only examples, and other information may be included.

At block 510, the user device may identify a connectivity information request received from the computing device. After performing at least one of the out-of-band and Wi-Fi discovery procedures, the seeker device may initiate a CIX operation. With the CIX message exchange, the devices may be able to know the type of connectivity (e.g., Wi-Fi Direct (or P2P), Wi-Fi infrastructure, or Wi-Fi Aware data link) that may be set up between the two devices and may have enough information to set up connectivity. The CIX operation includes a CIX request sent from the seeker device to the advertiser device requesting session information.

At block 512, the user device may determine one or more session information based at least in part on the connectivity information request. After receiving the CIX request, the advertiser device may collect the information related to the connection session to be established with the seeker device.

At block 514, the user device may cause to send a connectivity information response including the one or more session information. The advertiser device may respond with a CIX response that may return the session information necessary to establish the connection between the seeker device and the advertiser device. The CIX request and CIX response messages may include the following information: service ID, device ID, connectivity capability, corresponding connectivity attribute, and WPS/DPP configure methods (push button, PIN, or QC). Finally, the connection may be set up between the seeker device and the advertiser device in order to complete the service that was requested.

FIG. 6 shows a functional diagram of an exemplary communication station 800 in accordance with some embodiments. In one embodiment, FIG. 6 illustrates a functional block diagram of a communication station that may be suitable for use as a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include a physical layer circuitry 802, having a transceiver 810 for transmitting and receiving signals to and from other communication stations using one or more antennas 801. The physical layer circuitry 802 may also include MAC circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform the operations detailed in FIGS. 2-5.

In accordance with some embodiments, the MAC circuitry 804 may be arranged to contend for a wireless medium and configure frames or packets for communicating over the wireless medium, and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, a read-only memory (ROM), a random access memory (RAM), a magnetic disk storage media, an optical storage media, a flash-memory device and other storage devices and media.

In some embodiments, the communication station 800 may be part of a portable wireless communication device, such as a personal digital assistant (PDA), a laptop or a portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 7 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or a bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, the alphanumeric input device 912, and the UI navigation device 914 may be a touch screen display. The machine 900 may additionally include a storage device 916 (i.e., a drive unit), a signal generation device 918 (e.g., a speaker), a flexible connectivity device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine-readable medium 922 on which is stored one or more sets of data structures or instructions 924 (e.g., software) embodying or being utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The flexible connectivity device 919 may be configured to send a discovery request seeking a service. A service advertiser may be a wireless device that may advertise and provide one or more of these services over a wireless communication channel. The seeker device may perform an out-of-band discovery operation and/or a Wi-Fi discovery operation. The out-of-band discovery operation may be carried out using communication technologies that may be non-Wi-Fi, such as BLE, NFC, QR, etc. The Wi-Fi discovery operation may be carried out using communication technologies such as P2P, Wi-Fi infrastructure, or Wi-Fi Aware data link). With either of the discovery operations, the seeker device may send a discovery request to the advertiser device. The flexible connectivity device 919 may be configured to identify a discovery response received from a computing device advertising the service. The advertiser device may respond with a discovery response and provide various information related to the out-of-band discovery and/or the Wi-Fi discovery operations.

The flexible connectivity device 919 may be configured to send a connectivity information request to the computing device. After performing at least one of the out-of-band and Wi-Fi discovery procedures, the seeker device may initiate a CIX operation. With the CIX message exchange, the devices may be able to know the type of connectivity (e.g., Wi-Fi Direct (or P2P), Wi-Fi infrastructure, or Wi-Fi Aware data link) that may be set up between the two devices and may have enough information to set up connectivity. The CIX operation includes a CIX request sent from the seeker device to the advertiser device requesting session information.

The flexible connectivity device 919 may be configured to identify a connectivity information response including one or more session information received from the computing device. The advertiser device may respond with a CIX response that may return the session information necessary to establish a connection between the seeker device and the advertiser device. The CIX request and CIX response messages may include the following information: service ID, device ID, connectivity capability, corresponding connectivity attribute, and WPS/DPP configure methods (push button, PIN, or QC). Finally, the connection may be set up between the seeker device and the advertiser device in order to complete the service that was requested.

The flexible connectivity device 919 may be configured to send an advertisement for a service. For example, a printer may advertise that it may provide printing capabilities. The advertisement may be a broadcast message that may be sent by the advertiser device. When a seeker device is looking to perform a service, the seeker device may receive an advertisement message and may set up the discovery procedure between the seeker device and the advertiser device.

The flexible connectivity device 919 may be configured to determine a service match between the first service and the second service. If the advertised service and the sought service match, then the advertiser device may provide the seeker device with related discovery information. For example, if the advertised service is printing, and the sought service is for a print job, a service match may result in the advertiser and the seeker devices continuing to set up the connection between them in order to complete the print job.

The flexible connectivity device 919 may be configured to determine one or more session information based at least in part on the connectivity information request. After receiving the CIX request, the advertiser device may collect the information related to the connection session to be established with the seeker device.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

According to example embodiments of the disclosure, there may be a device. The device may include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory. The at least one processor of the one or more processors may be configured to execute the computer-executable instructions to cause to send one or more discovery requests using a plurality of out-of-band protocols seeking a service. The at least one processor of the one or more processors may be configured to execute the computer-executable instructions to identify two or more discovery responses received from a device advertising the service using at least one of the plurality of out-of-band protocols, the two or more discovery responses including a first discovery response and a second discovery response. The at least one processor of the one or more processors may be configured to execute the computer-executable instructions to cause to send, in response to one of the first discovery response and the second discovery response, a connectivity information request to the device using a first out-of-band protocol of the plurality of out-of-band protocols. The at least one processor of the one or more processors may be configured to execute the computer-executable instructions to identify a connectivity information response using the first out-of-band protocol, including one or more session information for a subsequent wireless connection using an in-band wireless protocol, received from the device. The at least one processor of the one or more processors may be configured to execute the computer-executable instructions to cause to establish the subsequent wireless connection using the in-band wireless protocol between the wireless device and the device for execution of the service based at least in part on the connectivity information response. The two or more discovery responses may be received sequentially, such that the first discovery response may be received before the second discovery response, and wherein the first out-of-band protocol may be associated with the first discovery response. The two or more discovery responses may be received sequentially, such that the first discovery response may be received before the second discovery response, and wherein the first out-of-band protocol may be associated with the second discovery response. The subsequent wireless connection may be established using at least one of peer-to-peer (P2P) connectivity topology, Wi-Fi infrastructure connectivity topology, or Wi-Fi Aware data path connectivity topology. The one or more discovery requests may be using a plurality of out-of-band protocols and a plurality of Wi-Fi discovery protocols. The session information may include at least one of a service ID, a device ID, connectivity capability, an interface media access control (MAC) address, connectivity information, or availability information. The out-of-band protocols may include at least one of Bluetooth low energy (BLE) discovery, near field communication (NFC) discovery, or quick response (QR) code discovery. The Wi-Fi discovery protocols may include at least one of a peer-to-peer (P2P), a Wi-Fi Aware, a Wi-Fi infrastructure, or a Wi-Fi Direct.

In example embodiments of the disclosure, there may be a non-transitory computer-readable medium storing computer-executable instructions which, when executed by a processor, cause the processor to perform operations. The operations may include causing to send an advertisement for a first service. The operations may include identifying a discovery request received from a computing device seeking a second service. The operations may include determining a service match between the first service and the second service. The operations may include causing to send a discovery response based at least in part on the service match. The operations may include identifying a connectivity information request received from the computing device. The operations may include determining one or more session information based at least in part on the connectivity information request. The operations may include causing to send a connectivity information response including the one or more session information. The operations may further include establishing a connection with the second computing device, based at least in part on the connectivity information response. The connection may be established using at least one of peer-to-peer (P2P) connectivity topology, Wi-Fi infrastructure connectivity topology, or Wi-Fi Aware data path connectivity topology. The discovery request may include at least one of an out-of-band discovery or a Wi-Fi discovery. The out-of-band discovery may include at least one of a service ID, a device ID, connectivity capability, an interface MAC address, connectivity information, or availability information. The out-of-band discovery may include at least one of Bluetooth low energy (BLE) discovery, near field communication (NFC) discovery, or quick response (QR) code discovery. The Wi-Fi discovery may include at least one of a peer-to-peer (P2P) discovery, Wi-Fi Aware discovery, Wi-Fi infrastructure discovery, or Wi-Fi Direct discovery.

In example embodiments of the disclosure, there may be a method. The method may include causing to send one or more discovery requests using a plurality of out-of-band protocols seeking a service. The method may include identifying two or more discovery responses received from a device advertising the service using at least one of the plurality of out-of-band protocols, the two or more discovery responses including a first discovery response and a second discovery response. The method may include causing to send, in response to one of the first discovery response and the second discovery response, a connectivity information request to the device using a first out-of-band protocol of the plurality of out-of-band protocols. The method may include identifying a connectivity information response using the first out-of-band protocol, including one or more session information for a subsequent wireless connection using an in-band wireless protocol, received from the device. The method may include causing to establish the subsequent wireless connection using the in-band wireless protocol between the wireless device and the device for execution of the service based at least in part on the connectivity information response. The subsequent wireless connection may be established using at least one of peer-to-peer (P2P) connectivity topology, Wi-Fi infrastructure connectivity topology, or Wi-Fi Aware data path connectivity topology. The one or more discovery requests may be using a plurality of out-of-band protocols and a plurality of Wi-Fi discovery protocols. The session information may include at least one of a service ID, a device ID, connectivity capability, an interface media access control (MAC) address, connectivity information, or availability information. The out-of-band protocols may include at least one of Bluetooth low energy (BLE) discovery, near field communication (NFC) discovery, or quick response (QR) code discovery.

In example embodiments of the disclosure, there may be a wireless communication apparatus. The apparatus may include a means for a means for causing to send one or more discovery requests using a plurality of out-of-band protocols seeking a service. The apparatus may include a means for identifying two or more discovery responses received from a device advertising the service using at least one of the plurality of out-of-band protocols, the two or more discovery responses including a first discovery response and a second discovery response. The apparatus may include a means for causing to send, in response to one of the first discovery response and the second discovery response, a connectivity information request to the device using a first out-of-band protocol of the plurality of out-of-band protocols. The apparatus may include a means for identifying a connectivity information response using the first out-of-band protocol, including one or more session information for a subsequent wireless connection using an in-band wireless protocol, received from the device. The apparatus may include a means for causing to establish the subsequent wireless connection using the in-band wireless protocol between the wireless device and the device for execution of the service based at least in part on the connectivity information response. The two or more discovery responses may be received sequentially, such that the first discovery response may be received before the second discovery response, and wherein the first out-of-band protocol may be associated with the first discovery response. The two or more discovery responses may be received sequentially, such that the first discovery response may be received before the second discovery response, and wherein the first out-of-band protocol may be associated with the second discovery response. The subsequent wireless connection may be established using at least one of peer-to-peer (P2P) connectivity topology, Wi-Fi infrastructure connectivity topology, or Wi-Fi Aware data path connectivity topology. The one or more discovery requests may be using a plurality of out-of-band protocols and a plurality of Wi-Fi discovery protocols. The session information may include at least one of a service ID, a device ID, connectivity capability, an interface media access control (MAC) address, connectivity information, or availability information. The out-of-band protocols may include at least one of Bluetooth low energy (BLE) discovery, near field communication (NFC) discovery, or quick response (QR) code discovery. The Wi-Fi discovery protocols may include at least one of a peer-to-peer (P2P), a Wi-Fi Aware, a Wi-Fi infrastructure, or a Wi-Fi Direct.

In example embodiments of the disclosure, there may be a wireless communication system. The system may include at least one memory that store computer-executable instructions, and at least one processor configured to access the at least one memory. The at least one processor may be configured to execute the computer-executable instructions to cause to send one or more discovery requests using a plurality of out-of-band protocols seeking a service. The at least one processor may be configured to execute the computer-executable instructions to identify two or more discovery responses received from a device advertising the service using at least one of the plurality of out-of-band protocols, the two or more discovery responses including a first discovery response and a second discovery response. The at least one processor may be configured to execute the computer-executable instructions to cause to send, in response to one of the first discovery response and the second discovery response, a connectivity information request to the device using a first out-of-band protocol of the plurality of out-of-band protocols. The at least one processor may be configured to execute the computer-executable instructions to identify a connectivity information response using the first out-of-band protocol, including one or more session information for a subsequent wireless connection using an in-band wireless protocol, received from the device. The at least one processor may be configured to execute the computer-executable instructions to cause to establish the subsequent wireless connection using the in-band wireless protocol between the wireless device and the device for execution of the service based at least in part on the connectivity information response. The two or more discovery responses may be received sequentially, such that the first discovery response may be received before the second discovery response, and wherein the first out-of-band protocol may be associated with the first discovery response. The two or more discovery responses may be received sequentially, such that the first discovery response may be received before the second discovery response, and wherein the first out-of-band protocol may be associated with the second discovery response. The subsequent wireless connection may be established using at least one of peer-to-peer (P2P) connectivity topology, Wi-Fi infrastructure connectivity topology, or Wi-Fi Aware data path connectivity topology. The one or more discovery requests may be using a plurality of out-of-band protocols and a plurality of Wi-Fi discovery protocols. The session information may include at least one of a service ID, a device ID, connectivity capability, an interface media access control (MAC) address, connectivity information, or availability information. The out-of-band protocols may include at least one of Bluetooth low energy (BLE) discovery, near field communication (NFC) discovery, or quick response (QR) code discovery. The Wi-Fi discovery protocols may include at least one of a peer-to-peer (P2P), a Wi-Fi Aware, a Wi-Fi infrastructure, or a Wi-Fi Direct.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product comprising a computer-readable storage medium, having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams and combinations of blocks in the block diagrams and flow diagrams can be implemented by special-purpose, hardware-based computer systems that perform the specified functions, elements, steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless device, comprising:
a transceiver configured to transmit and receive wireless signals;
an antenna coupled to the transceiver;
one or more processors in communication with the transceiver;
at least one memory that stores computer-executable instructions; and
at least one processor of the one or more processors configured to access the at least one memory, wherein the at least one processor of the one or more processors is configured to execute the computer-executable instructions to:
cause to send one or more discovery requests seeking a service, wherein each discovery request indicates a respective wireless protocol;
identify a first discovery response and a second discovery response received from a device advertising the service, wherein the first discovery response indicates a first non-Wi-Fi wireless protocol, and wherein the second discovery response indicates a second non-Wi-Fi wireless protocol;
select the first non-Wi-Fi wireless protocol for a connectivity information request;
cause to send, in response to one of the first discovery response and the second discovery response, the connectivity information request to the device using the first non-Wi-Fi wireless protocol;
identify a connectivity information response using the first non-Wi-Fi wireless protocol, including one or more session information for a subsequent wireless connection using a Wi-Fi wireless protocol, received from the device; and
cause to establish the subsequent wireless connection using the Wi-Fi wireless protocol between the wireless device and the device for execution of the service based at least in part on the connectivity information response.

2. The device of claim 1, wherein the first discovery response and the second discovery response are received sequentially, such that the first discovery response is received before the second discovery response.

3. The device of claim 1, wherein the first discovery response and the second discovery response are received substantially simultaneously.

4. The device of claim 1, wherein the subsequent wireless connection is established using at least one of peer-to-peer (P2P) connectivity topology, Wi-Fi infrastructure connectivity topology, or Wi-Fi Aware data path connectivity topology.

5. The device of claim 1, wherein the session information comprises at least one of a service ID, a device ID, connectivity capability, an interface media access control (MAC) address, connectivity information, or availability information.

6. The device of claim 1, wherein the first non-Wi-Fi wireless protocol comprises at least one of bluetooth low energy (BLE) discovery, near field communication (NFC) discovery, or quick response (QR) code discovery.

7. The device of claim 1, wherein the one or more discovery requests indicate Wi-Fi discovery protocols that include at least one of a peer-to-peer (P2P), a Wi-Fi Aware, a Wi-Fi infrastructure, or a Wi-Fi Direct.

8. A non-transitory computer-readable medium storing computer-executable instructions which, when executed by a processor, cause the processor to perform operations comprising:
causing to send an advertisement for a first service;
identifying a discovery request received from a computing device seeking a second service, wherein the discovery request indicates a wireless protocol;
determining a service match between the first service and the second service;
causing to send a discovery response based at least in part on the service match, wherein the discovery response indicates a non-Wi-Fi wireless protocol;
identifying a connectivity information request received from the computing device, wherein the connectivity information request uses the non-Wi-Fi wireless protocol;
determining one or more session information based at least in part on the connectivity information request; and
causing to send a connectivity information response including the one or more session information, wherein the connectivity information response uses the non-Wi-Fi wireless protocol and indicates a Wi-Fi wireless protocol for a subsequent wireless connection with the computing device for execution of the second service.

9. The non-transitory computer-readable medium of claim 8, wherein the computer-executable instructions cause the processor to further perform operations comprising:
establishing the subsequent wireless connection with the computing device, based at least in part on the connectivity information response, wherein the subsequent wireless connection uses the Wi-Fi wireless protocol.

10. The non-transitory computer-readable medium of claim 8, wherein the subsequent wireless connection is established using at least one of peer-to-peer (P2P) connectivity topology, Wi-Fi infrastructure connectivity topology, or Wi-Fi Aware data path connectivity topology.

11. The non-transitory computer-readable medium of claim 8, wherein the discovery request includes at least one of an out-of-band discovery or a Wi-Fi discovery.

12. The non-transitory computer-readable medium of claim 11, wherein the out-of-band discovery comprises at least one of a service ID, a device ID, connectivity capability, an interface MAC address, connectivity information, or availability information.

13. The non-transitory computer-readable medium of claim 11, wherein the out-of-band discovery includes at least one of bluetooth low energy (BLE) discovery, near field communication (NFC) discovery, or quick response (QR) code discovery.

14. The non-transitory computer-readable medium of claim 11, wherein the Wi-Fi discovery includes at least one of a peer-to-peer (P2P) discovery, Wi-Fi Aware discovery, Wi-Fi infrastructure discovery, or Wi-Fi Direct discovery.

15. A method comprising:
causing to send one or more discovery requests seeking a service, wherein each discovery request indicates a respective wireless protocol;
identifying a first discovery response and a second discovery response received from a device advertising the service, wherein the first discovery response indicates a first non-Wi-Fi wireless protocol, and wherein the second discovery response indicates a second non-Wi-Fi wireless protocol;
selecting the first non-Wi-Fi wireless protocol for a connectivity information request;
causing to send, in response to one of the first discovery response and the second discovery response, the connectivity information request to the device using the first non-Wi-Fi wireless protocol;
identifying a connectivity information response using the first non-Wi-Fi wireless protocol, including one or more session information for a subsequent wireless connection using a Wi-Fi wireless protocol, received from the device; and
causing to establish the subsequent wireless connection, using the Wi-Fi wireless protocol, with the device for execution of the service based at least in part on the connectivity information response.

16. The method of claim 15, wherein the subsequent wireless connection is established using at least one of peer-to-peer (P2P) connectivity topology, Wi-Fi infrastructure connectivity topology, or Wi-Fi Aware data path connectivity topology.

17. The method of claim 15, wherein the session information comprises at least one of a service ID, a device ID, connectivity capability, an interface media access control (MAC) address, connectivity information, or availability information.

18. The method of claim 15, wherein the first non-Wi-Fi wireless protocol comprises at least one of bluetooth low energy (BLE) discovery, near field communication (NFC) discovery, or quick response (QR) code discovery.

19. The device of claim 1, wherein the first non-Wi-Fi wireless protocol is activated by both the device and the device advertising the service.

20. The method of claim 15, wherein the first non-Wi-Fi wireless protocol is activated by the device advertising the service.

* * * * *